United States Patent
Biswas et al.

(10) Patent No.: US 10,277,682 B2
(45) Date of Patent: Apr. 30, 2019

(54) METHOD AND SYSTEM FOR RECOMMENDING FEATURES FOR DEVELOPING AN IOT APPLICATION

(71) Applicant: Tata Consultancy Services Limited, Mumbai (IN)

(72) Inventors: Swagata Biswas, Kolkata (IN); Tanushyam Chattopadhyay, Kolkata (IN); Arpan Pal, Kolkata (IN); Snehasis Banerjee, Kolkata (IN); Utpal Garin, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 41 days.

(21) Appl. No.: 15/817,720

(22) Filed: Nov. 20, 2017

(65) Prior Publication Data

US 2018/0146047 A1  May 24, 2018

(30) Foreign Application Priority Data

Nov. 22, 2016 (IN) .............................. 201621039907

(51) Int. Cl.
| | |
|---|---|
| H04L 29/08 | (2006.01) |
| G06K 9/62 | (2006.01) |
| G06N 7/00 | (2006.01) |
| G06F 8/36 | (2018.01) |
| G06F 8/30 | (2018.01) |

(Continued)

(52) U.S. Cl.
CPC ............. *H04L 67/125* (2013.01); *G06F 8/30* (2013.01); *G06F 8/36* (2013.01); *G06F 17/141* (2013.01); *G06F 17/148* (2013.01); *G06K 9/6231* (2013.01); *G06K 9/6245* (2013.01);

(Continued)

(58) Field of Classification Search
CPC .......... H04L 67/125; H04W 4/38; G06F 8/30; G06F 8/36; G06F 17/141; G06F 17/148; G06K 9/6231; G06K 9/6245; G06K 9/6269; G06N 7/00
See application file for complete search history.

(56) References Cited

U.S. PATENT DOCUMENTS

| | | | |
|---|---|---|---|
| 2008/0005721 A1 | 1/2008 | Harvey et al. | |
| 2014/0351790 A1* | 11/2014 | Ghose ....................... | G06F 8/70 717/120 |

(Continued)

OTHER PUBLICATIONS

Bhatia, S. et al. (Nov. 2015). "Analysis on different Data mining Techniques and algorithms used in IOT," *Shweta Bhatia Int. Journal of Engineering Research and Applications*, vol. 5; pp. 82-85.

*Primary Examiner* — Viva Miller
(74) *Attorney, Agent, or Firm* — Finnegan, Henderson, Farabow, Garrett & Dunner LLP

(57) ABSTRACT

A method and system has been provided for recommending features for developing an IoT analytics application. The method follows a deep like architecture. It comprises of three distinct layers. First layer is for input signal processing and other two layers are for feature reduction. The time domain, frequency domain and time-frequency domain features are extracted from the input signal. The invention uses multiple feature selection methods so that the union of the recommended features by these feature selection methods is significantly lesser than the initial set of features. The best feature combination is recommended using an exhaustive search.

12 Claims, 8 Drawing Sheets

(51) Int. Cl.
*G06F 17/14* (2006.01)
*H04W 4/38* (2018.01)

(52) U.S. Cl.
CPC .............. *G06K 9/6269* (2013.01); *G06N 7/00* (2013.01); *H04W 4/38* (2018.02)

(56) References Cited

U.S. PATENT DOCUMENTS

| | | |
|---|---|---|
| 2015/0019342 A1* | 1/2015 | Gupta ................ G06Q 30/0269 705/14.66 |
| 2016/0034809 A1 | 2/2016 | Trenholm et al. |
| 2017/0053032 A1* | 2/2017 | Liongosari ........ G06F 17/30598 |
| 2017/0053159 A1* | 2/2017 | Oh .......................... G06F 3/041 |

* cited by examiner

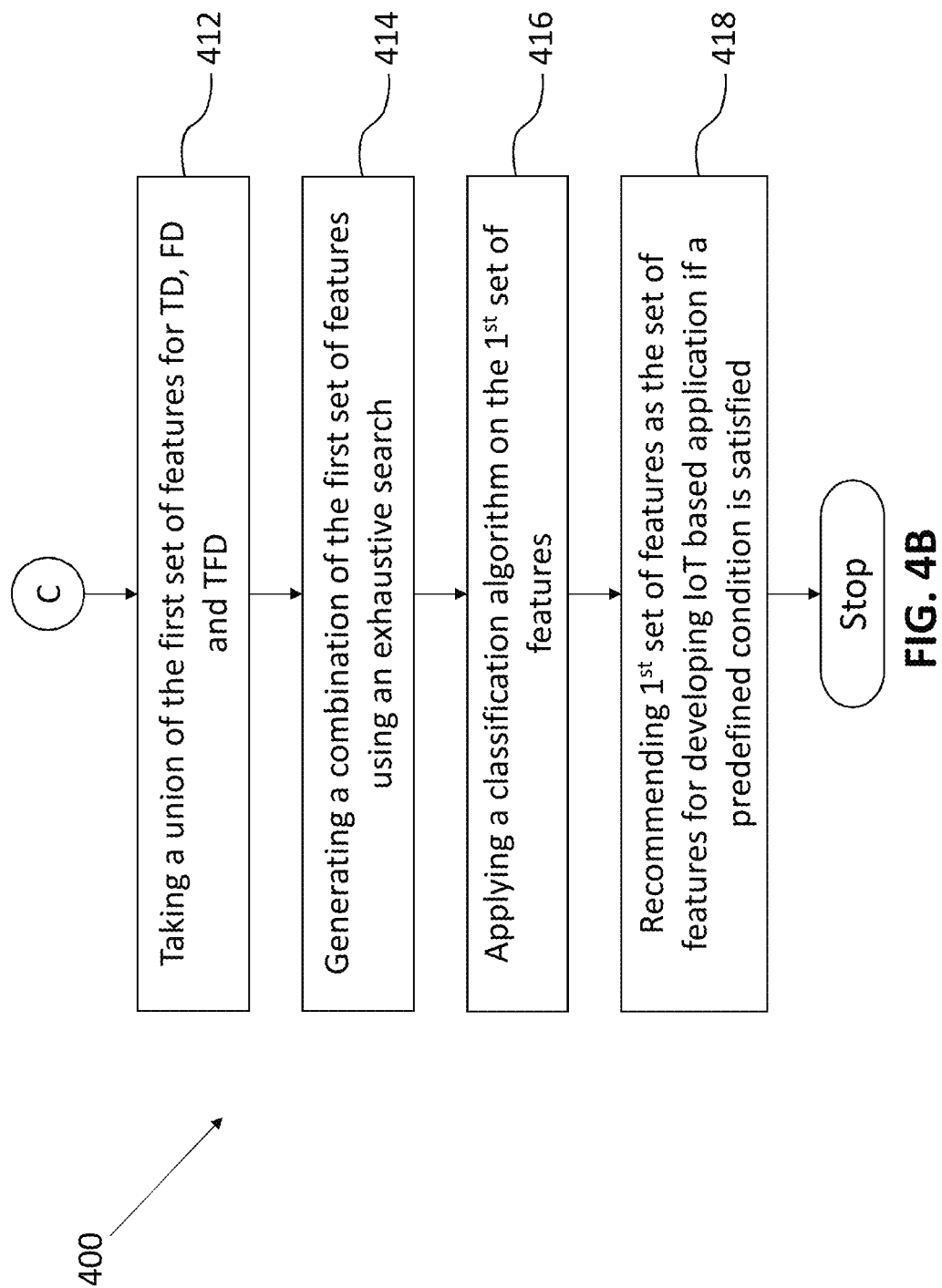

US 10,277,682 B2

METHOD AND SYSTEM FOR RECOMMENDING FEATURES FOR DEVELOPING AN IOT APPLICATION

CROSS-REFERENCE TO RELATED APPLICATIONS AND PRIORITY

The present application claims priority from Indian non-provisional specification no. 201621039907 filed on 22 Nov. 2016, the complete disclosure of which, in its entirety is herein incorporated by references.

TECHNICAL FIELD

The present application generally relates to the field of Internet of Things (IoT) application development. More particularly, but not specifically, the invention provides a system and method for recommending features for developing a sensor signal processing application in IoT.

BACKGROUND

The recent trends show that "Internet of Things (IoT)" is becoming a powerful business transformation force, and its disruptive impact is being felt across all industries and all areas of society. The internet of things (IoT) is the network of physical devices, vehicles, buildings and other items—embedded with electronics, software, sensors, actuators, and network connectivity that enable these objects to collect and exchange data. Internet of Things has the potential to bring in major changes in business models with potentially one trillion connected devices across the world. The unprecedented level of connectivity mandates new ideas and innovations encompassing several domains such as e-Governance, Health Care, Transportation, and Utilities etc. and also delves into the development of IoT analytics applications.

IoT analytics application development requires domain knowledge, sensor data analytics expertise, coding expertise, and knowledge about infrastructures so that it can be deployed properly. This is traditionally known as the four stake holders of IoT application development. But it is not possible for a single person to have all these knowledge. So the cost of application development increases in two aspects (i) time to development increases and (ii) the cost of hiring resources with niche skill set is also very high which in turn results into increase in the cost of the product. As a consequence there is a need of automation in IoT application development so that the time to market and the cost of hiring employees with niche skill set can be reduced. It is mandatory to involve people with domain knowledge as they mainly provides the problem but the effort from a signal processing expert and coder can be reduced if one can capture their knowledge and use it properly.

Some efforts have been made in the past for the automation of IoT application development. These methods are trying to capture the knowledge of a sensor signal processing expert and also get the corresponding codes from open sources. But two major things are missing (i) what are the steps for a sensor signal processing/analytics algorithm and (ii) which steps are required to be automated to reduce sensor signal processing expert's involvement. It has been found out that the most time consuming step in IoT application development is the feature selection. Deep learning is now a days very common for feature extraction in the domain of image processing and natural language processing (NLP). But in case of IoT application development there is a requirement to interpret the recommended features that Deep learning method can't serve.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for recommending a set of features for developing an Internet of Things (IoT) analytics application. The system comprises a sensor, a preprocessor, a memory and a processor in communication with the memory. The sensor captures an input signal. The preprocessor preprocesses the input signal to remove the noise from the input signal. The processor further comprises a discrete wavelet transformation (DWT) module, a Fourier transformation module, a time domain feature generation module, a first feature selection module, a second feature selection module, a union module, a classification module and a recommendation module. The discrete wavelet transformation (DWT) module applies a four level discrete wavelet transform by selecting a suitable mother wavelet on the input signal to generate a time frequency domain (TFD) set of features. The Fourier transformation module applies a short term Fourier transform on the input signal to generate a frequency domain (FD) set of features. The time domain feature generation module generates a time domain (TD) set of features from the input signal. The TFD set of features, FD set of features and the TD set of features are an initial set of features. The first feature selection module applies a first feature selection algorithm to the time domain, the frequency domain and the time-frequency domain set of features. The second feature selection module applies a second feature selection algorithm to the time domain, the frequency domain and the time-frequency domain set of features. The application of selection algorithms result in selection of a first set of features for time domain, frequency domain and time-frequency domain. The union module takes a union of the first set of features for TD, FD and TFD recommended by the first selection algorithm and the second selection algorithm. The exhaustive search module generates a combination of the first set of features using an exhaustive search. The combination of the first set of features is lesser than the set of features. The classification module applies a classification algorithm like support vector machine learning method on the first set of features. The recommendation module recommends the first set of features as the set of features for developing the IoT analytics application if a predefined condition is satisfied.

Another embodiment provides a method for recommending a set of features for developing an Internet of Things (IoT) analytics application. Initially, the input signal is provided to the processor. The input signal is normally received from the sensor. In the next step, the four level discrete wavelet transform is applied by selecting a suitable mother wavelet on the input signal to generate a time frequency domain (TFD) set of features. The short term Fourier transform is applied on the input signal to generate a frequency domain (FD) set of features. And the time domain (TD) set of features are generated from the input signal. The TFD set of features, FD set of features and the TD set of features are an initial set of features. In the next step, a first feature selection algorithm and a second feature selection algorithm are applied to the time domain, the frequency domain and the time-frequency domain set of features. The application of selection algorithms result in selection of a first set of features for the time domain, frequency domain and time-frequency domain. In the next step, a union of the first set of features for TD, FD and TFD recommended by the first selection algorithm and the second selection algorithm is taken. A combination of the first set of features is also generated using an exhaustive search. The combination of the first set of features is lesser than the initial set of features. A classification algorithm is applied on the first set of features. A support vector machine learning method is used for the classification. And finally, the first set of features are recommended as the set of features for developing the IoT analytics application if a predefined condition is satisfied.

In another embodiment, a non-transitory computer-readable medium having embodied thereon a computer program for recommending a set of features for developing an Internet of Things (IoT) analytics application. Initially, the input signal is provided to the processor. The input signal is normally received from the sensor. In the next step, the four level discrete wavelet transform is applied by selecting a suitable mother wavelet on the input signal to generate a time frequency domain (TFD) set of features. The short term Fourier transform is applied on the input signal to generate a frequency domain (FD) set of features. And the time domain (TD) set of features are generated from the input signal. The TFD set of features, FD set of features and the TD set of features are an initial set of features. In the next step, a first feature selection algorithm and a second feature selection algorithm are applied to the time domain, the frequency domain and the time-frequency domain set of features. The application of selection algorithms result in selection of a first set of features for the time domain, frequency domain and time-frequency domain. In the next step, a union of the first set of features for TD, FD and TFD recommended by the first selection algorithm and the second selection algorithm is taken. A combination of the first set of features is also generated using an exhaustive search. The combination of the first set of features is lesser than the initial set of features. A classification algorithm is applied on the first set of features. A support vector machine learning method is used for the classification. And finally, the first set of features are recommended as the set of features for developing the IoT analytics application if a predefined condition is satisfied.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which:

FIG. 4B is a flowchart illustrating a second portion of the steps of FIG. 4A;

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
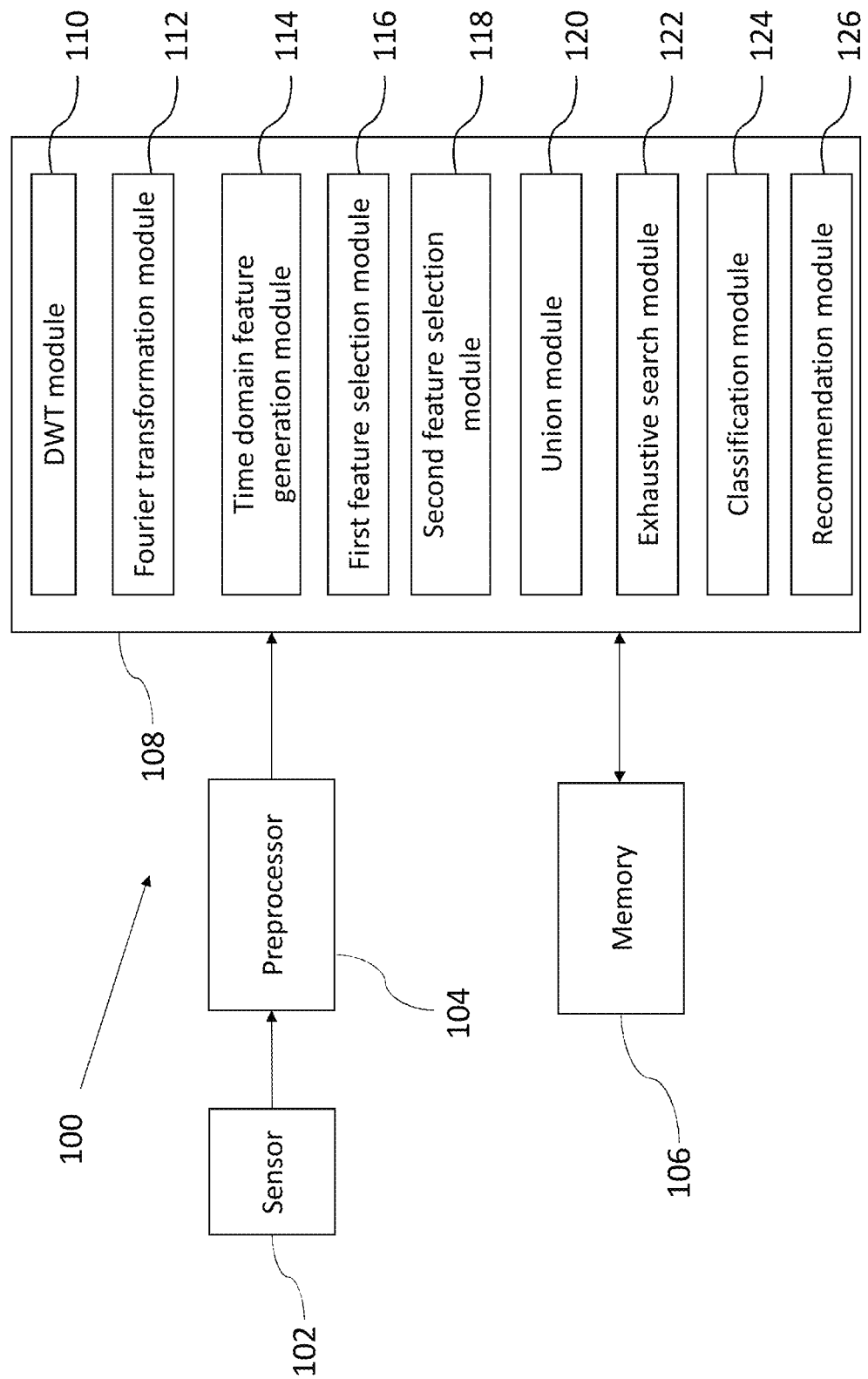
FIG. 1 illustrates a block diagram of a system for recommending a set of features for developing an Internet of Things (IoT) analytics application, in accordance with an embodiment of the present disclosure.

Referring now to the drawings, and more particularly to FIG. 1, where similar reference characters denote corresponding features consistently throughout the figures, there are shown preferred embodiments and these embodiments are described in the context of the following exemplary system and/or method.

Figure 2:
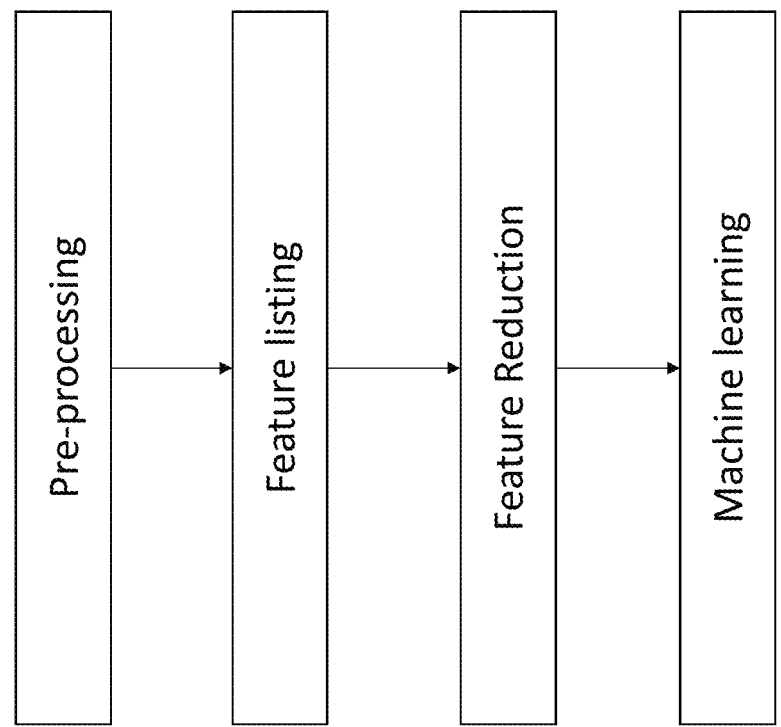
FIG. 2 is a flowchart illustrating the steps involved in developing the IoT analytics application, in accordance with an embodiment of the present disclosure.
Figure 6:
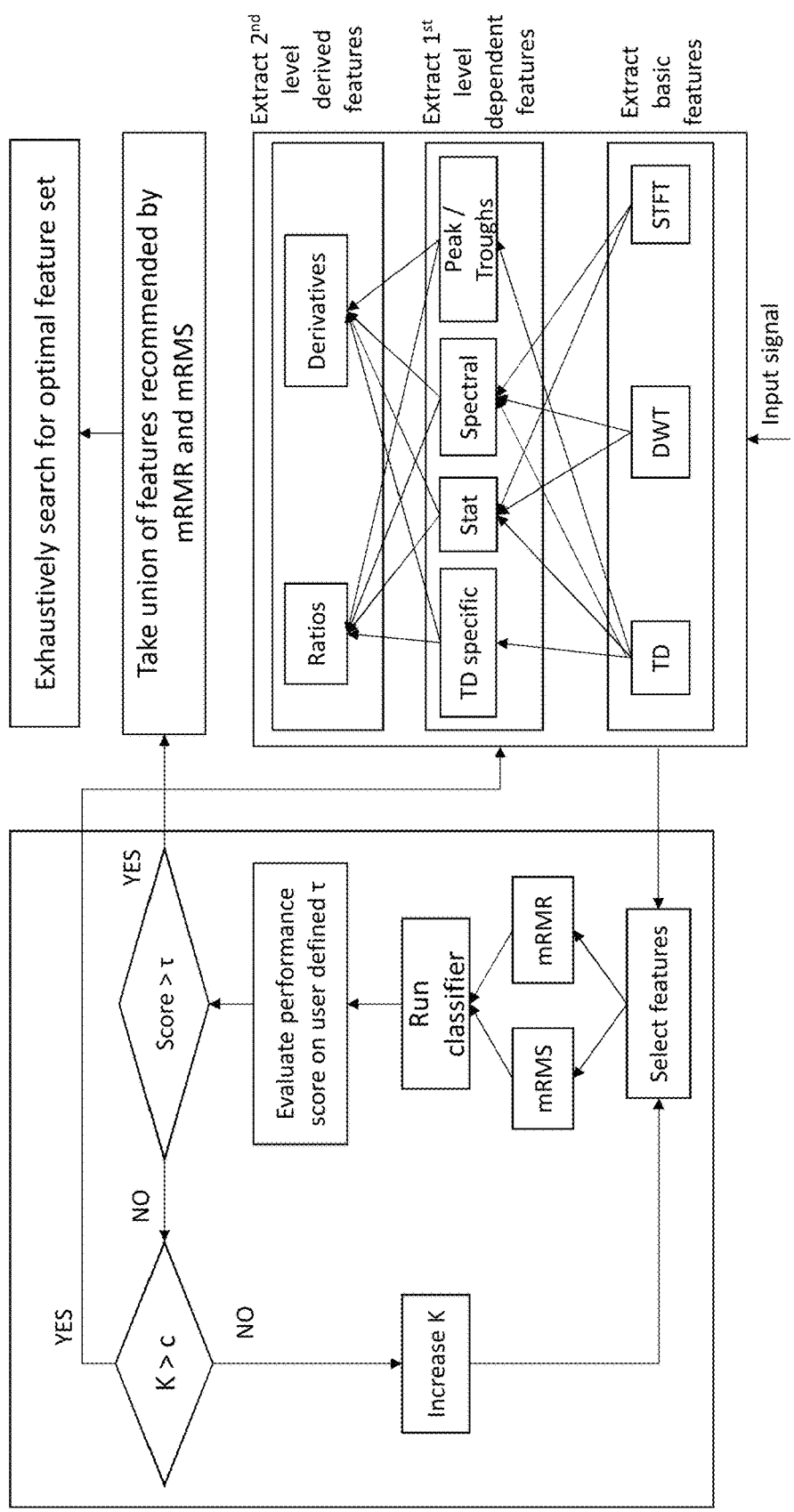
FIG. 6 shows a functional architecture of the system for recommending a set of features for developing an Internet of Things (IoT) analytics application, in accordance with an embodiment of the present disclosure.

According to an embodiment of the disclosure, a system 100 for recommending a set of features for developing an Internet of Things (IoT) analytics application is shown in FIG. 1. The system 100 is designed to reduce the development time for developing the IoT application. In the present embodiment, the disclosure is focusing on sensor signal processing application development in IoT. Though it should be appreciated the system 100 can also be used for any other type of IoT application. The system 100 automatically predict the sensor signal processing and machine learning steps involved in any classification problem of IoT application. The system involves construction of Deep like architecture using superset of features. The system 100 uses a hierarchical architecture of the features in a layered manner as depicted in FIG. 6 so that different combination of the features can be computed at different layers of the proposed architecture An IoT application development generic flowchart 200 is shown in FIG. 2. In general, the IoT application development involves a pre-processing module 202, feature listing module 204, feature reduction module 206 and Machine learning module 208. The pre-processing module 202 aims to filter out the noises in an input signal. This module also helps to remove the outlier in the signals. Different techniques can be used to accomplish pre-processing.

The feature listing module 204 is configured to list the features present in the input signal. Any signal is represented by some features. For example the input time domain sensor signal can be represented using its frequency domain representation obtained using Fourier Transformation.

The feature reduction module 206 is configured to reduce the total number of features in to a set of features which are most relevant for IoT application development. The possible number of features for a sensor signal is very huge and so it is required to reduce the number of features. In general, the features extracted from a sensor data can be classified into four classes namely (i) Harmful features: the features responsible for misclassification, (ii) Essential features: the features who play the most important role in classification, (iii) Indifferent features those are neither harmful nor essential, and (iv) Redundant features: they are usually the subset of essential features but removal of some of this features can produce same recognition accuracy that is obtained by essential features. Feature reduction techniques are selected with the following points keeping in mind: (i) Interaction among the features, (ii) Interaction among the features with machine learning tool, (iii) Goal to achieve which can be obtained from an annotated data set, and (iv) Interpretability of the reduced feature.

The machine learning module 208 takes the experience which is a representation of the feature set and the label as input and optimizes some parameters like accuracy, sensitivity to accomplish a goal like classification.

According to an embodiment of the disclosure, the system 100 comprises a sensor 102, a preprocessor 104, memory 106 and a processor 108 in communication with the memory 106. The processor 108 is configured to read a plurality of algorithms stored in the memory 106 to perform various functions. The processor 106 further includes a plurality of modules such as a discrete wavelet transformation (DWT) module 110, a Fourier transformation module 112, a time domain feature generation module 114, a first feature selection module 116, a second feature selection module 118, a union module 120, an exhaustive search module 122, a classification module 124 and a recommendation module 126.

According to an embodiment of the disclosure, the input signal is provided to the preprocessor 104. In an example, the input signal is a time domain signal. The preprocessor 104 is configured to remove noise from the input signal. In addition to that, the preprocessor 104 is configured to compute the mean of amplitude of the input time domain signal and obtain the mean subtracted time domain signal by subtracting the mean from the original signal. The entire signal is then split into non overlapping windows of window size and obtain the peak and turf for each window where the window size is 128 data points which is approximately a 2 min data.

Generally, the input signal comprises three types of features namely time domain (TD) features, Fourier transformation bases frequency domain (FD) features and discrete wavelet transform based (DWT) time frequency domain (TFD) features. According to an embodiment of the disclosure, the discrete wavelet transformation (DWT) module 110 is configured to apply a four level discrete wavelet transform on the input signal. The DWT module 110 selects an optimal mother wavelet on the input signal to generate a time frequency domain (TFD) set of features. The optimal mother wavelet is selected using the property of maximum energy to entropy ratio. The approximate coefficients of level 4 and the detailed coefficients of level 2, 3 and 4 are used as features. The level 1 detail coefficients are discarded as spectral analysis revealed no significant information in that frequency range.

According to an embodiment of the disclosure, the Fourier transformation module 112 is configured to applying a short term Fourier transform (STFT) on the input signal to generate a frequency domain (FD) set of features and the time domain feature generation module 114 is configured to generate a time domain (TD) set of features from the input signal. The TFD set of features, FD set of features and the TD set of features are an initial set of features.

According to an embodiment of the disclosure, the time domain, the frequency domain and the time frequency domain set of features are then provided to the first feature selection module 116 and the second feature selection module 118. The first feature selection module 116 applies a first feature selection algorithm to the time domain, the frequency domain and the time-frequency domain set of features. The second feature selection module 118 applies a second feature selection algorithm to the time domain, the frequency domain and the time-frequency domain set of features. The application of the selection algorithms result in selection of a first set of features for time domain, frequency domain and time-frequency domain.

Figure 3A:
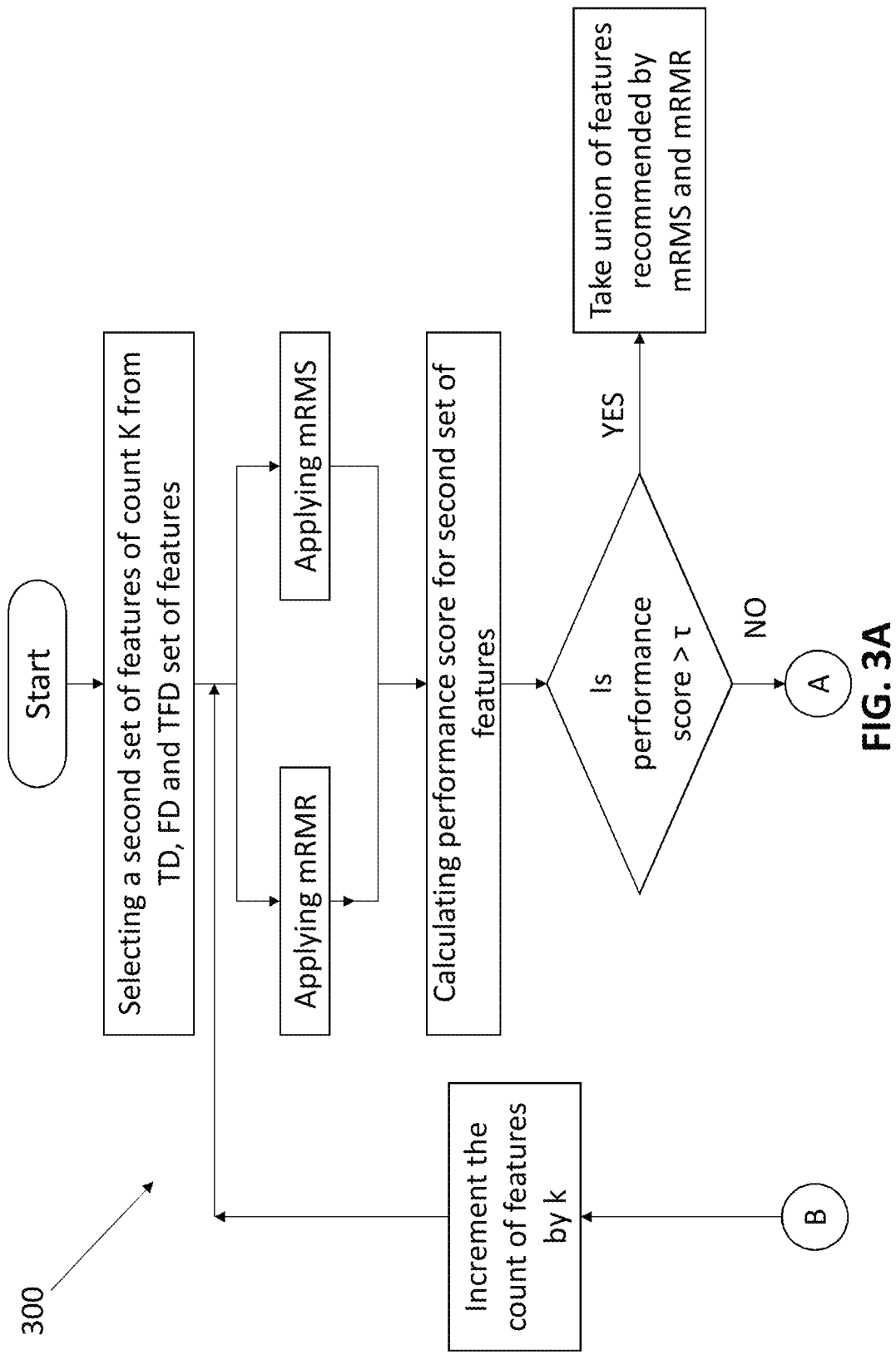
FIG. 3A is a flowchart illustrating steps involved in the feature selection algorithms to select a first set of features, in accordance with an embodiment of the present disclosure.
Figure 3B:
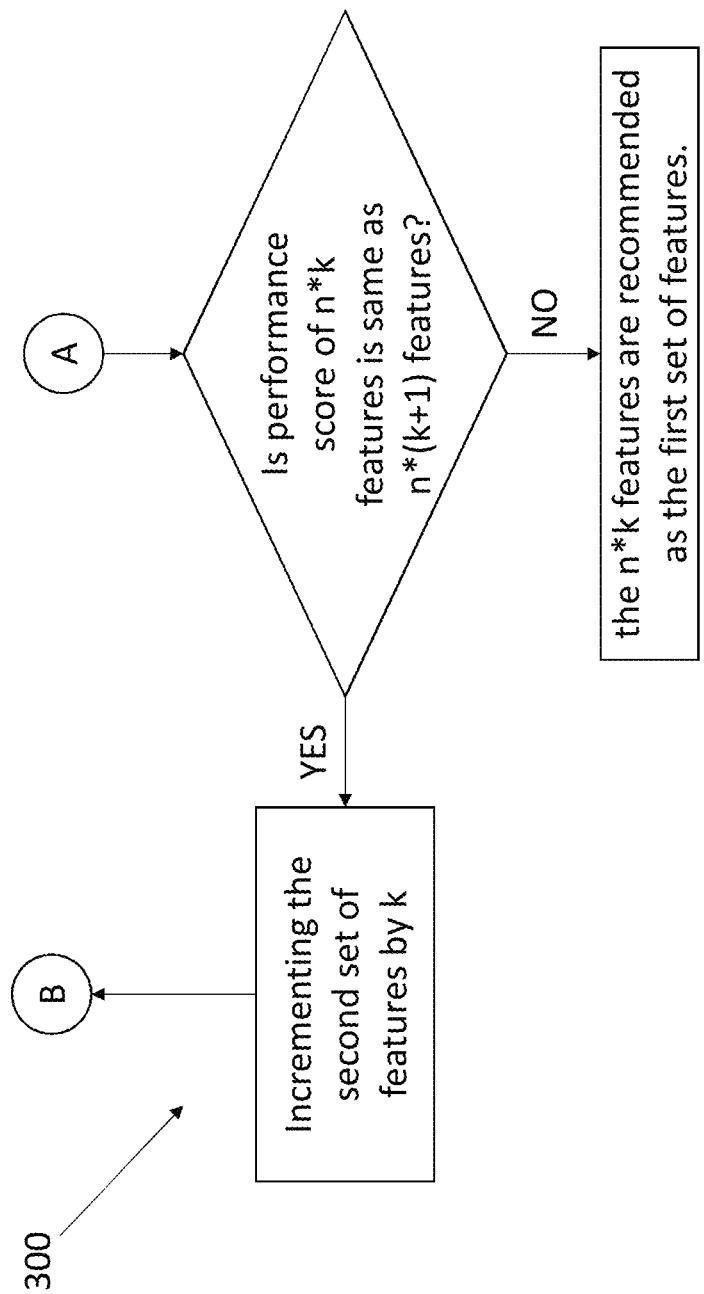
FIG. 3B is a flowchart illustrating a second portion of the steps of FIG. 3A.

According to an embodiment of the disclosure, the first selection algorithm is minimum redundancy maximum relevance (mRMR) algorithm and the second selection algorithm is maximum relevance maximum significance (mRMS) algorithm. It should be appreciated that the use of any other feature selection algorithm is well within the scope of this disclosure. A flowchart 300 in FIG. 3A-3B shows the steps involved in the feature selection algorithms to select the first set of features. Initially, a second set of features of count k are selected from each TD, FD and TFD set of features. In the next step, the performance of the second set of features are tested using the mRMR algorithm and the mRMS algorithm. A performance score is calculated for the second set of features. The performance score of the second set of features is tested with respect to a predefined score $\tau$. In the next step, if performance score is more than predefined score $\tau$, then a union of features recommended by mRMS and mRMR is taken. Else if performance score is more than predefined score $\tau$, then in the next step it is checked that if the performance score of n*k features is same as n*(k+1) features. If not the same then the count of second set of features is incremented by k. The previous steps of incrementing and testing is repeated for n number of times. If the performance is not same then incrementing the second set of features by k continues. If the performance is same then the step of incrementing is terminated. And in the final step, the n*k features are recommended as the first set of features.

According to an embodiment of the disclosure, the union module 120 is configured to take the union of the first set of features for TD, FD and TFD recommended by the first selection algorithm and the second selection algorithm. At this stage, the number of feature is reduced. Further, the exhaustive search module 122 is configured to generate a combination of the first set of features using an exhaustive search. The combination of the first set of features is significantly lesser than the initial set of features;

According to an embodiment of the disclosure, the classification module 124 is configured to apply a classification algorithm. In an example support vector machine learning method has been applied on the first set of features. The use of any other machine learning method is well within the scope of this disclosure. The support vector machine (SVM) machine learning is applied with different kernels namely (i) linear, (ii) radial basis function (RBF), (iii) sigmoid, and (iv) polynomial and each of the kernels are tested with different parameter values using a python script.

Figure 5:
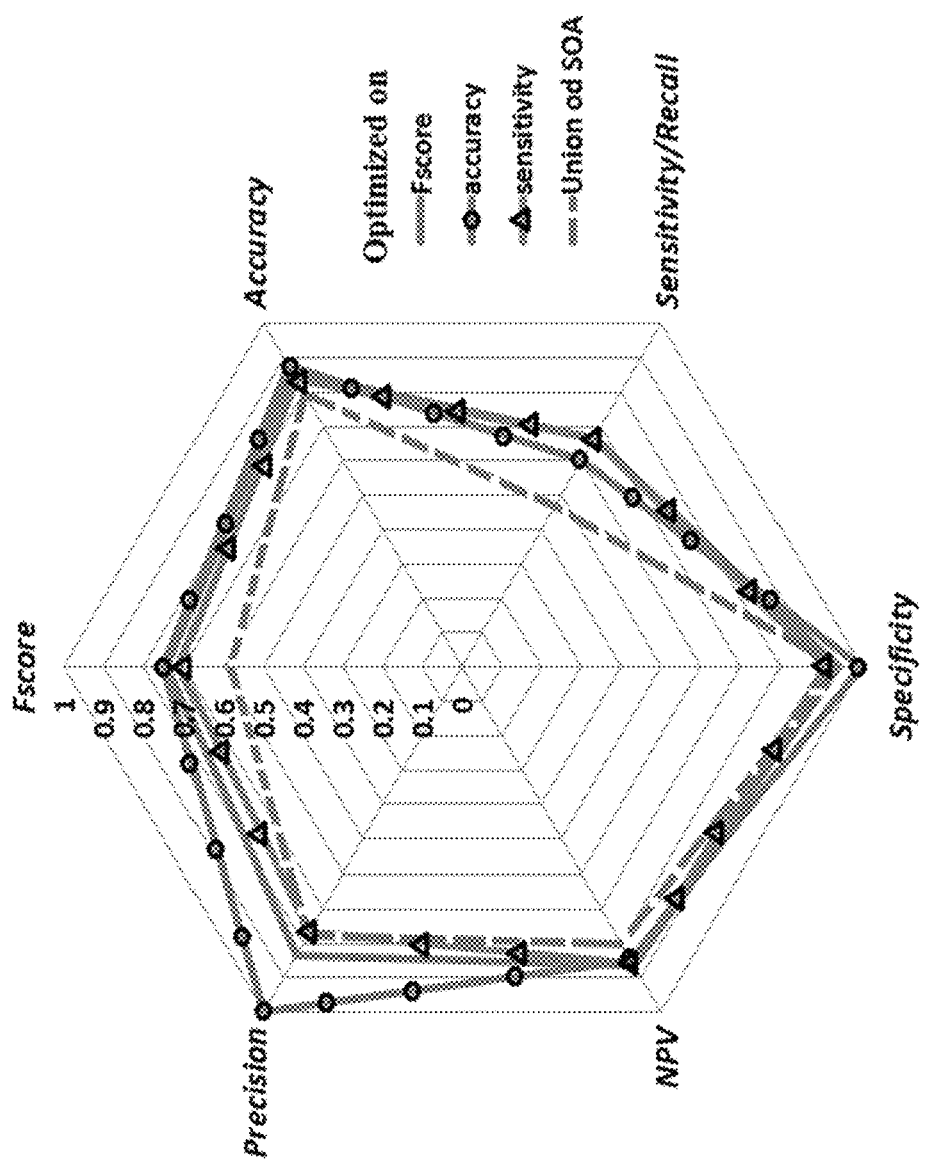
FIG. 5 is a plot showing the performance of the feature recommendation based on different matrices, in accordance with an embodiment of the present disclosure.

According to an embodiment of the disclosure, the recommendation module 126 recommends the first set of features as the set of features for developing the IoT analytics application if a predefined condition is satisfied. The predefined condition is estimated using state of art performance for various features. The various features may include accuracy, sensitivity, f-score, precision and specificity. The parameters of the obtained set of features are compared with the state of the art result. The performance of the feature recommendation based on different matrices is shown in FIG. 5.

Figure 4A:
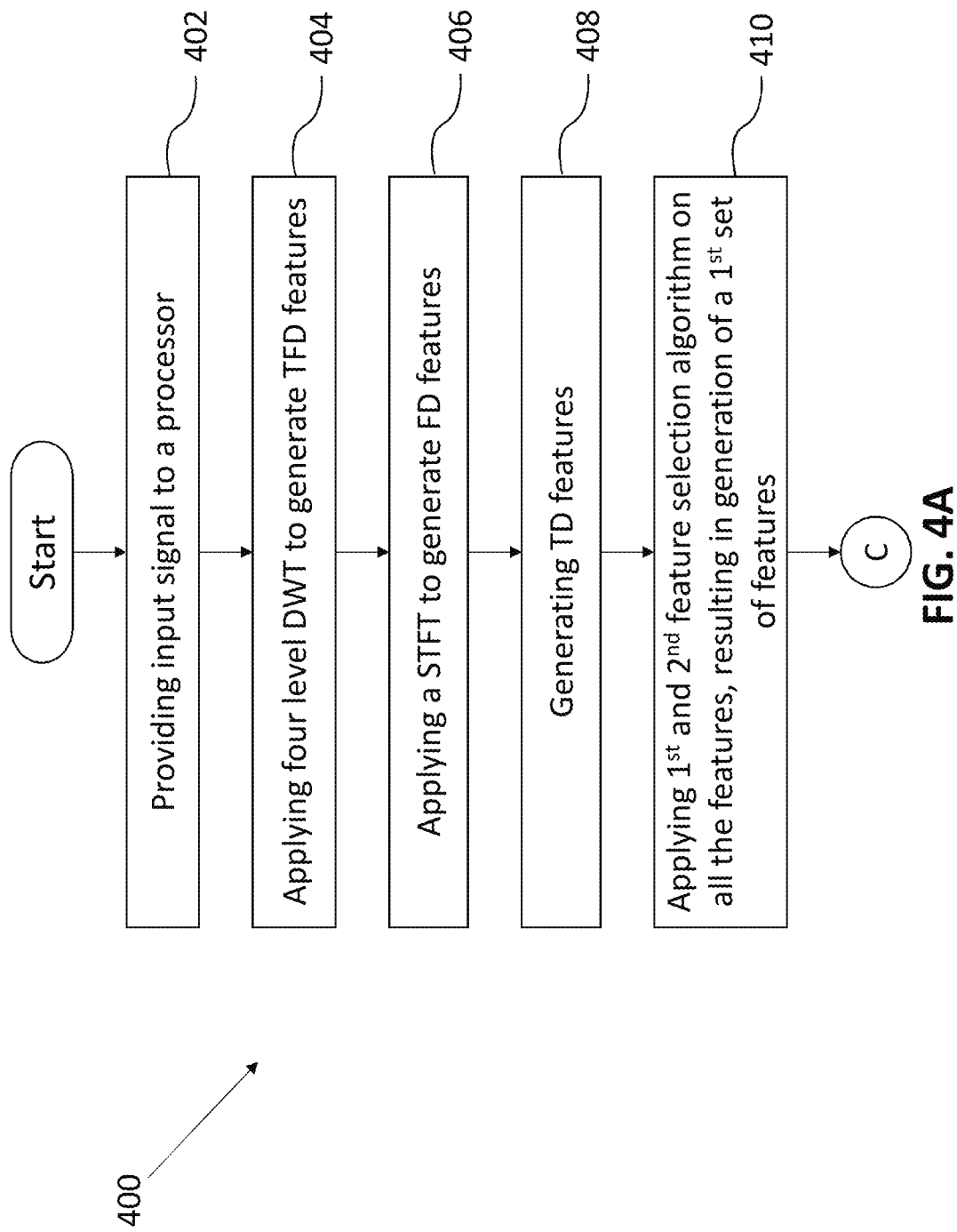
FIG. 4A is a flowchart illustrating the steps involved in recommending a set of features for developing an Internet of Things (IoT) analytics application, in accordance with an embodiment of the present disclosure.

In operation, a flowchart 400 for recommending a set of features for developing an Internet of Things (IoT) analytics application is shown in FIG. 4A-4B according to an embodiment of the disclosure. Initially at step 402, the input signal is provided to the processor 108. The input signal is normally received from the sensor 102. In the next step 404, the four level discrete wavelet transform is applied by selecting a suitable mother wavelet on the input signal to generate a time frequency domain (TFD) set of features. At step 406, the short term Fourier transform is applied on the input signal to generate a frequency domain (FD) set of features. At step 408, the time domain (TD) set of features are generated from the input signal.

In the next step 410, a first feature selection algorithm and a second feature selection algorithm are applied to the time domain, the frequency domain and the time-frequency domain set of features. The application of selection algorithms result in selection of a first set of features for the time domain, frequency domain and time-frequency domain. It should be appreciated that in an embodiment, the first selection algorithm is minimum redundancy maximum relevance (mRMR) algorithm and the second selection algorithm is maximum relevance maximum significance (mRMS) algorithm. In the next step 412, a union of the first set of features for TD, FD and TFD recommended by the first selection algorithm and the second selection algorithm is taken. At step 414, a combination of the first set of features is generated using an exhaustive search. The combination of the first set of features is then significantly lesser than the initial set of features. At step 416, a classification algorithm is applied on the first set of features. In an embodiment support vector machine learning method is used for the classification. And finally at step 418, the first set of features are recommended as the set of features for developing the IoT analytics application if a predefined condition is satisfied.

According to an embodiment of the disclosure, the system and method follows a deep like architecture as shown in the architectural diagram of FIG. 6. The hierarchical architecture of the features is provided in a layered manner so that different combination of the features can be computed at different layers of the proposed architecture. It comprises of three distinct layers. In the first layer the input is the preprocessed and in the other two layers feature reduction techniques are applied as mentioned above.

Experimental Setup

According to an embodiment of the disclosure, the system 100 can also be explained with the help of experiments. The experiment is performed on 3 data sets out of which one data set is publicly available i.e. the Bearing dataset from the Prognostics Data Repository. This data set used as a machine automation case study. The rest two data sets use Pulse Plethysmogram (PPG) sensor signal to classify blood pressure into high and low and the other data set is used to classify the emotion into happy and sad. The bearing data packet (IMS-Rexnord Data.zip) consists of three datasets describing a test to failure experiment. Each dataset comprises of several files each of which has a record of 1 sec vibration signal snapshot which are recorded at specific intervals. The sampling rate is 20 KHz, recording interval is 10 min and there are 20480 data points in each of the file. In the present experiment the second dataset have been used. It has 984 files. Each individual file holds the record of 4 channels representing 4 bearings where the first bearing eventually turns faulty due to outer race failure.

The experiment was performed in two ways. In the first case only the bearing 1 data is considered. State of the art shows that the bearing 1 starts degrading after the 700th point where each file is denoted as a point. So here a two class classification problem was formulated where the first 700 files are considered to be healthy and the rest i.e. 282 (the last 2 files discarded due to some noisy signal value) files are considered to be faulty. In the second case, all the bearings have been considered to formulate the two class classification problem. The bearing dataset has 984 files. Each file has record of 4 bearings. Therefore the total number of good bearing samples is 3652 (1st 700 samples of 1st bearing and 984 samples of each of the three other bearings) and the number of faulty bearing samples is 282 (last 282 files of 1st bearing). To avoid any biasness the data was segregated into 5 datasets. Each of the dataset consisting of 282 faulty bearing samples and 730 good bearing samples.

The second dataset that is used to classify the blood pressure into high and low, records the PPG signal of 118 subjects from Bangalore and Gujarat. Among the 118 subjects, 15 subjects have high systolic blood pressure and 103 have low systolic blood pressure. To avoid any biasness due to imbalance in the dataset, the dataset is segregated into three datasets. Each of the dataset consists of the PPG signal record of 49 subjects, 15 subjects having high systolic blood pressure and 34 subjects having low systolic blood pressure. The sampling rate is 60 Hz.

The third dataset that is used to classify the emotion into happy and sad, records the fingertip pulse oximeter data of 33 healthy subjects (13F and 20M) with average age 27. No two emotion elicitation video was shown to a subject in one single day. The Pulse Oximeter is used to detect and record the PPG signal. Standard video stimuli was used which itself served as ground-truth and the rigorous experimentation procedure ensured that the time synchronization error between the stimuli and recorded physiological data is always less than 1 sec.

Experimental Results

For each of the dataset the experiment were performed as described below. The signal is subjected to 4 level Discrete Wavelet Transformation (DWT) and Short term Fourier Transformation (STFT). Also the peak was derived and trough location information for each signal. The window size considered is 128 data points. The top 5 features are extracted for each feature file using mRMR and mRMS. These selected features are then fed into a classifier Support Vector Machine and tested using 5 fold cross validation using different kernels. The proposed method selects the parameter k i.e. the number of features to be selected depending on the obtained accuracy and the predefined score $\tau$ which is obtained from the state of the art. For the data set 1 and 3 the accuracy was greater than $\tau$ from the first level of features but for the data set 2 the accuracy varies with k. The recognition accuracy increases with increases of k for all features. Results obtained from the first layer of the proposed design for first and third data set are depicted in Table II and Table IV respectively. Similarly the results of exhaustive search applied on the union of mRMR and mRMS recommended features for these two data sets. These two state of the art feature selection methods aims to optimize the objective function based on the metric redundancy, significance, and relevance. So the recommended features do not include any redundant or harmful features along with the essential features. But exhaustive search can help to remove the indifferent features and thus it is possible to get a better accuracy in compared to the state of the art methods with a less number of features. Moreover most of the literatures reports the classification performance based on accuracy or f-score and exhaustive search was used to optimize exactly these metrics. Exhaustive search on the reduced feature set is applied on the 2nd data set and tries to evaluate the performance of different metrics while the optimization is tried on different parameters. This result is shown in FIG. 5. This figure shows that mostly all parameters are optimized if the exhaustive search tries to recommend the features by optimizing on the metric accuracy. On the other hand it is better to optimize sensitivity only if the user is required to optimize sensitivity.

TABLE II

RESULTS OF FEATURE RECOMMENDATION FROM NASA DATASET

| Feature List | Initial Feature Dimension | Feature Selection Method | no of features selected | SVM RBF Kernel | SVM linear Kernel |
|---|---|---|---|---|---|
| STFT (Win Size = 128 | 20480 | mRMS | 5 | 99.187 | 98.8821 |
| STFT (Win Size = 128 | 20480 | mRMR | 5 | 99.187 | 99.187 |
| Peak Trough (Win Size = 128 | 640 | mRMS | 5 | 94.501 | 94.8065 |
| Peak Trough (Win Size = 128 | 640 | mRMR | 5 | 94.9084 | 95.6212 |
| DWT (bior3.9) | 10304 | mRMS | 5 | 73.9796 | 71.3265 |
| DWT (bior3.9) | 10304 | mRMR | 5 | 76.4286 | 71.326 |
| STFT + Peak Trough + DWT | 31424 | mRMS | 5 | 74.2857 | 71.4286 |
| STFT + Peak Trough + DWT | 31424 | mRMR | 5 | 99.3878 | 99.0816 |

TABLE III

RESULTS OF EXHAUSTIVE SEARCH FOR OPTIMAL FEATURE COMBINATION ON NASA DATASET

| Feature List | No of features Recommended | SVM linear Kernel | SVM RBF Kernel |
|---|---|---|---|
| DWT + STFT + Peak Trough (Union of mRMRs) (1) | 15 | 99.5918 | 100 |
| DWT + STFT + Peak Trough (Union of mRMSs) (2) | 11 | 99.4898 | 99.3878 |
| DWT + STFT + Peak Trough (Union of mRMS and mRMR) (3) | 24 | 100 | 99.7959 |
| Exhaustive Feature Selection on 1 | 10 | 100 | 99.6939 |
| Exhaustive Feature Selection on 2 | 8 | 99.6939 | 99.4898 |

TABLE IV

RESULTS OF EMOTION CLASSIFICATION FROM PPG

| Feature List | Initial Feature Dimension | Feature Selection Method | no of features selected | SVM linear Kernel |
|---|---|---|---|---|
| STFT (Win Size = 600 | 12000 | mRMS | 5 | 73.84 |
| STFT (Win Size = 600 | 12000 | mRMR | 5 | 70.76 |
| Time Domain signal (Win Size = 600 | 12000 | mRMS | 5 | 80 |
| Time Domain signal (Win Size = 600 | 12000 | mRMR | 5 | 75.38 |
| DWT (bior3.9) | 6037 | mRMS | 5 | 75.38 |
| DWT (bior3.9) | 6037 | mRMR | 5 | 76.92 |

TABLE V

RESULTS OF EXHAUSTIVE SEARCH FOR OPTIMAL FEATURE COMBINATION

| Feature List | No of features Recommended | SVM linear Kernel |
|---|---|---|
| DWT + STFT + Time Domain signal (Union of mRMRs) (1) | 15 | 87.69 |
| DWT + STFT + Time Domain signal (Union of mRMSs) (2) | 15 | 90.91 |
| Exhaustive Feature Selection on 1 | 7 | 87.69 |
| Exhaustive Feature Selection on 2 | 11 | 90.91 |

The tables II-V shows that each of the TD, FD and DWTD features can classify the data set with 99.38% accuracy at most. But by taking the union of all the features recommended by the used feature selection methods a 100% accuracy is achieved with 15 features. There is a possibility of presence of indifferent features in those methods there is a possibility of getting an optimal set of feature combination which includes less number of features yet giving the same level of classification accuracy from those 15 features by eliminating indifferent features from there. Any dimension reduction technique cannot be used as the features need to be interpreted. Thus exhaustive feature selection method was used that optimally finds out the best combination of features for which can get the highest classification accuracy. Thus the proposed method can classify the good bearing and the bad bearing using only 8 features as shown in the Table V Similar results are obtained for the other two datasets, too. Overall accuracy of all three data sets and its comparison with state of the art methods in terms of accuracy and effort spent are shown in Table VI below. The time taken in the proposed method are Data Preparation: Few hours; Feature Selection (mRMR/mRMS): Few Minutes; ML (with different kernels and parameters): 30 min, Exhaustive search: 3-4 hours (for 25 features); Total: 1-2 days.

TABLE VI

COMPARISON OF PROPOSED METHOD AGAINST STATE OF THE ART FOR DIFFERENT DATA SETS

| Data set | SOA no of features | Recommended no of features | SOA accuracy | Recommended accuracy | SOA effort | Recommended effort |
| --- | --- | --- | --- | --- | --- | --- |
| NASA data set | 15 | 10 | 99.38 | 100 | 6 months | 2 days |
| Emotion data set | 16 | 11 | 82.3 | 90.91 | 4 months | 2 days |
| BP data set | 23 | 15 | 79.5 | 87.8 | 6 months | 2 days |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims. The embodiment, thus provides the system and method for recommending a set of features for the IoT analytics application.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for recommending a set of features for developing an Internet of Things (IoT) analytics application, the method comprising a processor implemented steps of:
    providing an input signal received from a sensor to the processor;
    applying a four level discrete wavelet transform by selecting a suitable mother wavelet on the input signal to generate a time frequency domain (TFD) set of features;
    applying a short term Fourier transform on the input signal to generate a frequency domain (FD) set of features;
    generating a time domain (TD) set of features from the input signal, wherein the TFD set of features, the FD set of features and the TD set of features are an initial set of features;
    applying a first feature selection algorithm and a second feature selection algorithm to the time domain, the frequency domain and the time-frequency domain set of features, wherein the application of selection algorithms result in selection of a first set of features for the time domain, the frequency domain and the time-frequency domain;
    taking a union of the first set of features for TD, FD and TFD recommended by the first selection algorithm and the second selection algorithm;
    generating a combination of the first set of features using an exhaustive search, wherein the combination of the first set of features is lesser than the initial set of features;
    applying a classification algorithm including a support vector machine learning method using a different set of kernels on the combination of the first set of features; and
    recommending the first set of features as the set of features for developing the IoT analytics application if a predefined condition is satisfied.

2. The method of claim 1, further comprising calculation of spectral and statistical features from the first set of features if the predefined condition is not satisfied, resulting in generation of a second set of features.

3. The method of claim 2, further computing the ratios and derivatives of the second set of features to generate a third set of features.

4. The method of claim 1, wherein the step of applying the first feature selection algorithm and the second feature selection algorithm further comprising:
    selecting a second set of features of count k from each TD, FD and TFD set of features;
    calculating a performance score of the second set of features;
    testing the performance score of the second set of features with respect to a predefined score τ;
    incrementing the count of the second set of features by k if performance score is more than the predefined score τ;
    repeating the step of incrementing and testing for n number of times;
    checking if the performance of nk features is same as n(k+1) features,
        if no then continue incrementing the second set of features by k,
        else, terminating the steps of incrementing; and
    recommending nk features as the first set of features.

5. The method of claim 1, wherein the first selection algorithm is minimum redundancy maximum relevance (mRMR) algorithm and the second selection algorithm is maximum relevance maximum significance (MRMS) algorithm.

6. The method of claim 1, further comprises the step of preprocessing the input signal to remove noise before providing the input signal to the processor.

7. The method of claim 1, wherein the time domain set of features are derived by subtracting the mean of the amplitude of the input signal from the given preprocessed input signal.

8. The method of claim 1, wherein the time frequency domain set of features comprise $1^{st}$, $2^{nd}$, $3^{rd}$ and $4^{th}$ level detail coefficients and $4^{th}$ level approximate coefficients.

9. The method of claim 1, wherein the different set of kernels include linear, radial basis function, sigmoid and polynomial.

10. The method of claim 1, wherein the input signal is a time domain signal.

11. A system for recommending a set of features for developing an Internet of Things (IoT) analytics application, the system comprising:
    a sensor for capturing an input signal;
    a preprocessor for preprocessing the input signal to remove the noise from the input signal;
    a memory; and
    a processor in communication with the memory, wherein the processor further comprising:
        a discrete wavelet transformation (DWT) module for applying a four level discrete wavelet transform by selecting a suitable mother wavelet on the input signal to generate a time frequency domain (TFD) set of features;
        a Fourier transformation module for applying a short term Fourier transform on the input signal to generate a frequency domain (FD) set of features;
        a time domain feature generation module generating a time domain (TD) set of features from the input signal, wherein the TFD set of features, the FD set of features and the TD set of features are an initial set of features;
        a first feature selection module for applying a first feature selection algorithm to the time domain, the frequency domain and the time-frequency domain set of features;
        a second feature selection module for applying a second feature selection algorithm to the time domain, the frequency domain and the time-frequency domain set of features, wherein the application of selection algorithms result in selection of a first set of features for the time domain, the frequency domain and the time-frequency domain;

a union module for taking a union of the first set of features for TD, FD and TFD recommended by the first selection algorithm and the second selection algorithm;

an exhaustive search module for generating a combination of the first set of features using an exhaustive search, wherein the combination of the first set of features is lesser than the set of features;

a classification module for applying a classification algorithm including a support vector machine learning method using a different set of kernels on the combination of the first set of features; and a recommendation module for recommending the first set of features as the set of features for developing the IoT analytics application if a predefined condition is satisfied.

12. A non-transitory computer-readable medium having embodied thereon a computer program for developing an Internet of Things (IoT) analytics application, the method comprising a processor implemented steps of:

providing an input signal received from a sensor to the processor;

applying a four level discrete wavelet transform by selecting a suitable mother wavelet on the input signal to generate a time frequency domain (TFD) set of features;

applying a short term Fourier transform on the input signal to generate a frequency domain (FD) set of features;

generating a time domain (TD) set of features from the input signal, wherein the TFD set of features, the FD set of features and the TD set of features are an initial set of features;

applying a first feature selection algorithm and a second feature selection algorithm to the time domain, the frequency domain and the time-frequency domain set of features, wherein the application of selection algorithms result in selection of a first set of features for the time domain, the frequency domain and the time-frequency domain;

taking a union of the first set of features for TD, FD and TFD recommended by the first selection algorithm and the second selection algorithm;

generating a combination of the first set of features using an exhaustive search, wherein the combination of the first set of features is lesser than the initial set of features;

applying a classification algorithm including a support vector machine learning method using a different set of kernels on the combination of the first set of features; and recommending the first set of features as the set of features for developing the IoT analytics application if a predefined condition is satisfied.

* * * * *